United States Patent [19]

Mitchell

[11] 4,200,233
[45] Apr. 29, 1980

[54] WINDSHIELD CLEANING SYSTEM

[76] Inventor: Ronald G. Mitchell, 1909 N. Juniper, Roswell, N. Mex. 88201

[21] Appl. No.: 902,704

[22] Filed: May 4, 1978

[51] Int. Cl.$^2$ .......................... B05B 9/04; B05B 15/06
[52] U.S. Cl. ..................................... 239/280; 239/588
[58] Field of Search .............. 239/273, 276, 279, 280, 239/280.5, 281, 289, 373, 588; 248/80, 87; 222/399, 400.7, 530

[56] References Cited

U.S. PATENT DOCUMENTS

| | | | |
|---|---|---|---|
| 1,360,559 | 11/1920 | Monahan | 248/80 |
| 2,939,671 | 6/1960 | Beekman | 239/273 |
| 2,948,479 | 8/1960 | Graceman | 239/588 |
| 2,971,520 | 2/1961 | Motis et al. | 239/588 |
| 2,989,245 | 6/1961 | Matthewson | 239/373 |
| 3,219,275 | 11/1965 | Green | 239/373 |
| 4,135,669 | 1/1979 | Bridges et al. | 239/373 |

FOREIGN PATENT DOCUMENTS 474293 11/1914 France ....................................... 239/280

*Primary Examiner*—John J. Love
*Assistant Examiner*—Michael J. Forman
*Attorney, Agent, or Firm*—Gipple & Hale

[57] ABSTRACT

Apparatus for washing a surface such as the windshield of a vehicle or the like, which includes a pressurized source of washing fluid having a conduit connected thereto, the conduit extending upwardly in supported relationship with an upstanding selectively positioned support member, the upper end portion of the conduit extending above the upper end of the support member for connection at its end to an extensible flexible hose. The support member supports the hose in an elevated position above a supporting surface for access to the surface to be washed, the other end of the hose having a nozzle thereon by means of which washing fluid transported from the pressurized source may be selectively sprayed on the surface to be washed.

6 Claims, 1 Drawing Figure

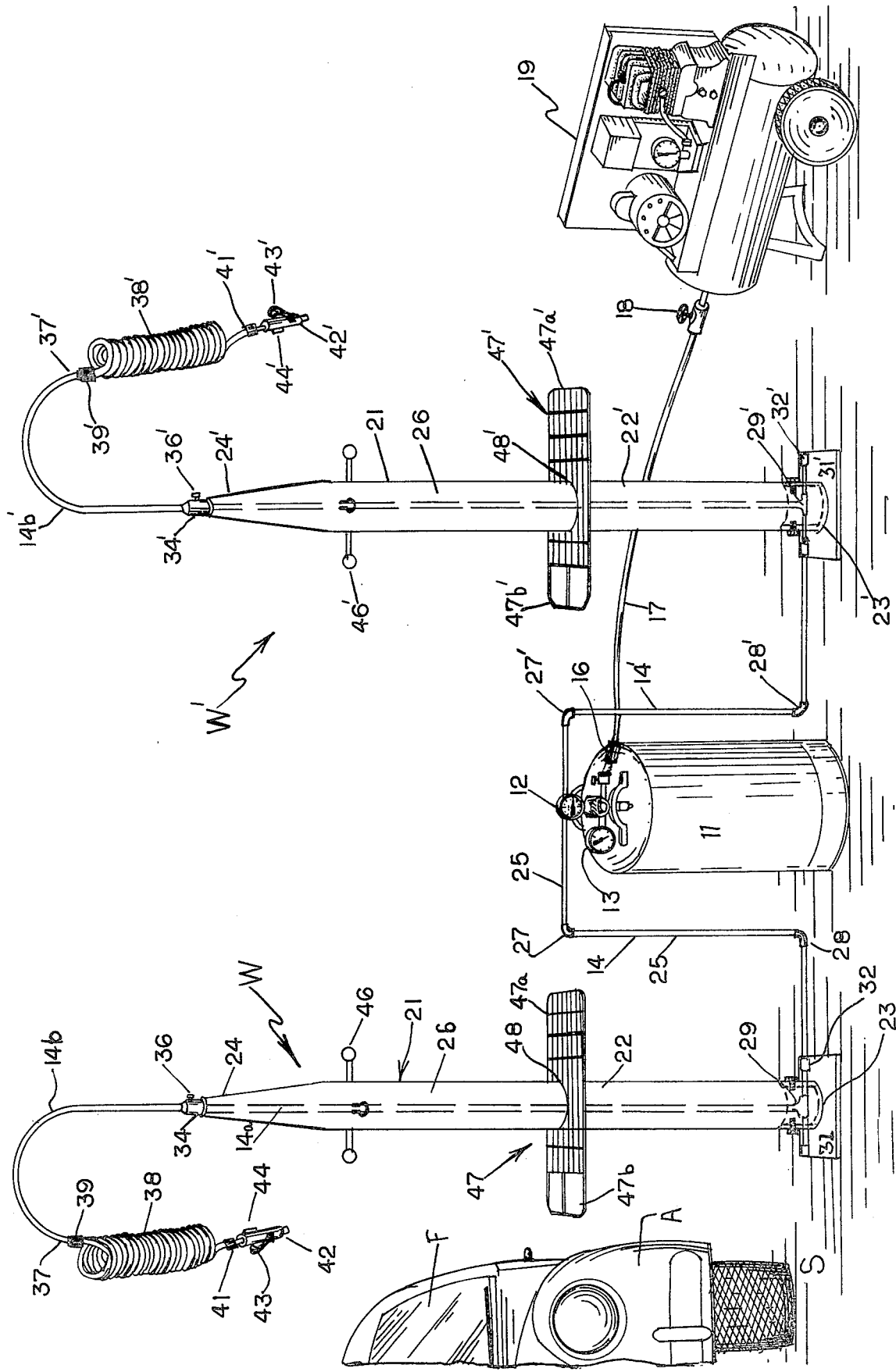

WINDSHIELD CLEANING SYSTEM

FIELD OF THE INVENTION

This invention generally relates to washing apparatus and more particularly to apparatus for washing a surface such as a vehicle windshield.

DESCRIPTION OF THE PRIOR ART

In order to perform a washing operation on surfaces to be cleaned, various devices such as hand held spray bottles, garden hoses and the like have been used, each particular type of washing device being selected in accordance with the type of surface to be washed. For instance, a typical motorist prefers that his or her windshield be washed by a service station attendant, preferably during each gas stop, to remove the accumulation of dirt and other foreign materials which collect quickly on the motorist's windshield under normal driving conditions. Unless the windshield is clean, the driver's vision is obscured or at least hampered contributing to hazardous driving conditions.

The most common type of windshield washing device in use today is a squeege, which is dipped into a bucket of water and run across the windshield. Such washing does not generally remove crushed insect bodies on the windshield and commonly deposits dirty water (the bucket of water seldom being changed) onto the vehicle windshield and body leaving a dirty or oily smear across the windshield when it dries. In addition dirt deposits are carried by the water off onto the windshield wiper which redeposits the dirt on the windshield the first time that the wiper is used.

Another common type of windshield washing device in use today utilizes a hand held container of washing fluid with some kind of spray nozzle which is manually manipulated by an attendant to apply the washing fluid in the container to various portions of the windshield. The use of such hand held spray containers is at best inadequate for performing a good washing operation on a vehicle windshield in that even the most careful attendant fails to apply washing fluid upon the entire windshield during repeated spray applications and spray nozzles of the type used on such containers are characterized by wide variation in the amount of material applied and the area covered during each spray operation. Furthermore, such containers hold only a small supply of washing fluid and must be repeatedly refilled. Another problem is that such containers are frequently misplaced or removed from the premises, so that frequently they are not available when a washing operation is to be performed.

Accordingly, a primary object of this invention is to provide a new and novel washing apparatus for a surface such as the windshield of a vehicle.

Another object of this invention is to provide a new and novel washing apparatus which permits an operator such as a service station attendant to perform an efficient washing operation on a vehicle windshield or the like in a rapid, highly efficient manner.

A further object of this invention is to provide a new and novel washing apparatus for cleaning vehicle windshields or the like which is simple and inexpensive in construction, which utilizes readily available components and which provide a source of washing fluid under pressure in a highly convenient manner for use by relatively unskilled operators.

A still further object of this invention is to provide a new and novel washing apparatus for vehicle windshields or the like, which permits a plurality of washing operations to be carried out simultaneously, which is capable of repeated use for prolonged periods of time without replenishment and which provides all the necessary cleaning tools to permit a complete washing and drying operation to be performed.

Still another object of this invention is to provide a new and novel washing apparatus for vehicle windshields and the like which does not require that the vehicle be parked in an exact position relative to the apparatus, requires virtually no maintenance, which may be utilized by a relatively unskilled operator such as a motorist and which occupies a minimum of space so as to avoid interference with vehicles and the like.

SUMMARY OF THE INVENTION

A washing apparatus for vehicle windshields or the like which includes a source of pressurized washing fluid and an upstanding support stand which may be positioned in any selected location on a supporting surface. Conduit means are connected at one end to the washing fluid source and extend in supported relationship with the support stand, the upper end of the conduit having connected thereto an extensible flexible hose. The hose is supported in an elevated position with a nozzle mounted to the other end so that it may be manipulated by an operator to dispense pressurized washing fluid onto a vehicle windshield or the like, the extensible hose permitting the operator to move the nozzle during the dispensing operation to effectively apply the washing fluid to the vehicle windshield of a vehicle parked in the reasonable proximity of the support stand.

BRIEF DESCRIPTION OF THE DRAWING

An understanding of the present invention will become apparent upon consideration of the following detailed description of specific embodiments thereof, especially when taken in conjunction with the accompanying drawing, in which:

The single FIGURE of the drawing is a perspective view of a washing apparatus constructed in accordance with the invention in operative association with a parked vehicle whose windshield is to be washed, portions of the apparatus being duplicated for simultaneous washing of two vehicles.

DETAILED DESCRIPTION OF THE PREFERRED EMBODIMENT

Referring now to the drawing, there is shown a washing apparatus in accordance with the invention designated generally by the letter W. Portions of the washing apparatus W are duplicated or arranged in a tandem relationship by the provision of an additional washing device designated generally by the letter W', wherein like numerals are utilized to identify like parts. In the illustrated preferred embodiment of the invention a washing apparatus W is shown in operative association with a vehicle such as an automobile A having a front windshield F suitably parked at the supporting surface S adjacent washing apparatus W, it being understood that another vehicle may be similarly parked adjacent to washing apparatus W' for simultaneous washing if desired.

As specifically illustrative of the invention, a source of pressurized washing fluid such as a chemical cleaning agent is provided in a stainless steel tank 11 for containing a supply of washing fluid. The tank 11 may be of any suitable conventional construction and it will be noted that the tank 11 is associated with both washing apparatus W and W'. The tank 11 includes an air pressure regulator 12, a pressure gauge 13 and an outlet suitably connected by a fitting or the like to conduit means such as galvanized ½ inch supply pipes 114, 14' for supplying washing fluid from the tank 11 to both of the tandem arranged washing apparatus W and W' will be explained more fully later on.

The washing fluid in tank 11 is designed to be pressurized and to this end, the tank 11 is provided with a fitting 16 to which one end of a pressure hose 17 is suitably attached. The pressure hose 17 is arranged to communicate at its other end through a valve 18 with the outlet of an air compressor 19 which may be of any suitable, commercially available construction. In the illustrated embodiment, the compressor 19 is preferrably a small oiless compressor. Alternately an electric motor, explosion-proof completely portable gasoline engine could be used for field work. In situations where a service station has its own air supply, no compressor is needed.

The best mode of the washing apparatus W comprises an upstanding support member stand 21 which, in the illustrated embodiment, comprises a tubular steel pipe casing 22 having a bottom end 23, an open upper tapered end 24 and an interior 26. The conduit 14 leading from the tank 11 has a portion 14a which extends upwardly from the bottom end 23 of the casing 22 through the interior 26 with a portion 14b extending upwardly and outwardly from the open end of the casing. Preferably, the conduit 14 is made up of a plurality of galvanized ½ inch pipe sections 25 interconnected by suitable elbows 27 and 28 and a T-fitting 29 disposed adjacent the support stand bottom end 23. Preferably, the conduit 14 extends horizontally along the support member bottom 23 through the T-fitting 29 so that portions of the conduit 14 extend on opposite sides of the fitting 29.

Means are provided for positioning the support stand 22 in the illustrated upstanding position in any selected location on the supporting surface S. More specifically, a base plate 31 is provided on which is mounted the portions of the conduit 14 on opposite sides of the fitting 29. The base plate can be provided with a threaded sleeve on which the casing is screwed or welded onto upstanding angle members on the casing itself. Clamps 32 hold the conduit in a fixed position, so that the support stand 22 may be moved and positioned to any suitable location.

The upper end portion 14b of the conduit 14 which extends from the support stand upper end 24 is suitably supported on the support casing 22 by means of a fitting 34 suitably mounted on the support stand end 24. The conduit 14 is preferably clamped into fitting 34, and therefore releasably supported on the support stand 22 by means of a lock nut such as a wing nut 36.

The upper end portion 14b of the conduit 14 is formed in a downwardly depending arcuate configuration having a downwardly directed forward end 37. If desired, the conduit end portion 14b may be formed separately from the portion 14a of the conduit 14 extending within the support stand 22, the fitting 34 serving to interconnect the conduit portions 14a and 14b.

Extensible hose means 38 are provided on the washing apparatus W which, in the illustrated embodiment, may be formed by a nylon hose of the recoil type which, in the relaxed condition is of helical shape with adjacent convolutions of the hose 38 positioned in closely adjacent relationship. The upper end of the extensible hose 38 is connected by a quick disconnect fitting 39 to the forward end 37 of the conduit portion 14b to suspend the extensible hose 38 in an elevated position over the supporting surface S and adjacent the windshield of the parked vehicle A as shown in the drawing.

The lower end 41 of the extensible hose 38 is connected to a spray nozzle 42 of conventional construction provided with a manually operated trigger 43, which is urged into a closed condition for the nozzle 42. Preferably, in order to safely tuck the extensible hoze 38 and nozzle 42 in a storage position, magnetic means are provided for attaching the spray nozzle 42 to the support stand 22. More specifically, the nozzle 42 is provided with a magnet 44 which upon engagement with the outer surface of the support stand 22 which is preferably of steel construction magnetically attaches itself thereto.

The washing apparatus W also includes suitable means for suspending towels, wiping cloths or the like which are used during a washing operation. More specifically, at least one, and preferably a plurality of laterally extending posts 46 are suitably mounted by welding or the like to the outer wall of the support stand 22 adjacent the upper end 24. As can be understood, these posts 46 which are hook threaded lock nuts serve for the hanging of towels or the like readily available to the attendant or operator during the washing operation.

The washing apparatus W also includes chrome steel rack means 47 suitably secured to the support stand 22 intermediate the ends 23 and 24 for supporting tools or other items which may be needed during a washing or related operation. In the illustrated embodiment, the tool rack 47 may be in the form of a grating 47a having a plate portion 47b, a central opening 48 being provided in the grating for accommodating the support stand 22. The rack 47 is suitably attached to the support stand 22 by any suitable means such as welding or the like.

The washing apparatus W' which is connected to the supply tank 11 by means of conduit 14' is constructed identically to that of the washing apparatus W. Accordingly, the washing apparatus W' includes a support means 21' including a hollow support stand 22' having a bottom end 23' and upper end 24' and a hollow interior 26'. The conduit 14' includes fittings 27', 28', 29' and a base plate 31' attached to the conduit 14' by means of clamps 32'. The upper portion 14b' of the conduit 14' is connected to the support stand 22' by means of a fitting 34' having a lock nut 36' and a forward end 37' attached by means of a fitting 39' to the upper end of an extensible hose 38'. The lower end 41' of the extensible hose 38' is connected to a nozzle 42' and is provided with a manually operated trigger 43' and a magnet 44' by means of which the nozzle is secured in the storage position on the support stand 22'. The towel hanging means or posts 46' are provided on the support stand 22' together with a rack 47' having a grating portion 47a', a plate portion 47b' and a central opening 48' also mounted on the support stand 22' as shown.

In the operation of the invention, the component parts of the apparatus of the invention are interconnected in the manner shown in the drawing with either one or both of the washing apparatuses W, W' arranged in the assembled condition for use on one or two vehicles respectively. Air compressor 19 is actuated and valve 18 opened to supply pressurized air to the tank 11 which has been filled with washing fluid. The pressure of the air from the compressor 19 may be adjusted by means of the regulator 12 so that the conduit 14 is filled with the washing fluid and maintained therein under pressure by the normally closed nozzle 42.

When a vehicle is parked adjacent to the washing unit W or another vehicle is also adjacent to washing unit W', the operator or attendant grasps the nozzle 42 and moves it adjacent to the windshield F on the vehicle as permitted by the flexibility of the extensible nylon recoil hose 38. The trigger 43 on the nozzle 42 may then be depressed and washing fluid under pressure is injected in a spray form onto the windshield F in a uniform, well distributed layer for the subsequent cleaning operation. Paper towels or the like may be suspended on posts 46 and are utilized to wipe the washing fluid from the windshield F during the cleaning operation after the nozzle 42 has been released by the operator, permitting the hose 38 to return to the retracted position shown in the drawing.

While the preferred embodiment of the invention has been disclosed, it is understood that the invention is not limited to such an embodiment since it may be otherwise embodied in the scope of the appended claims.

What is claimed is:

1. A washing apparatus comprising, in combination, a supply tank for containing a washing agent, transfer means allowing communication of said tank with a conduit means, an air compressor, means for connecting said air compressor to said supply tank to pressurize the washing agent in said tank, an upstanding elongated hollow support member defining an interior and an open upper end, said conduit means with a single flow path mounted to said support member and positioned to extend through said support member interior so that the support member forms a protective barrier and through said open upper end in supported relationship therewith, the upper end portion of said conduit means extending from the upper end of said support member being formed in a downwardly depending arcuate configuration, spaced away from the lower end portion of the conduit means, a base plate formed with a threaded sleeve operatively connected to a threaded lower end of said support member for positioning said support member in a selected location allowing said support member to be removed for maintenance and part replacement, an extensible hose connected at one end to the upper end of said conduits means by a quick disconnect fitting and supported in an elevated position on said conduit, and a manually operated spray nozzle on the other end of said extensible hose for dispensing washing fluid onto a surface to the cleaned.

2. A washing apparatus in accordance with claim 1 including at least one laterally extending post mounted on the exterior of the support member to provide a hanger for towels and the like.

3. A washing apparatus in accordance with claim 1 including chrome steel rack means in the form of a grating mounted on the exterior of said support member for supporting tools and the like.

4. A washing apparatus in accordance with claim 1, including magnetic means on said nozzle for magnetically attaching said nozzle to said support member in a storage position.

5. A washing apparatus in accordance with claim 1 wherein said supply tank is stainless steel and the means for connecting said transfer means to said tank includes adjustable means to regulate the pressure in the tank an air compressor, means for connecting said air compressor to said supply tank to pressurize the washing agent in said tank.

6. A washing apparatus in accordance with claim 1 wherein said conduit means comprises a rigid tube, and wherein the upper end portion of said tube is mounted to and communicates with an extensible nylon recoil hose.

* * * * *